United States Patent [19]

Sakata

[11] Patent Number: 5,194,962

[45] Date of Patent: Mar. 16, 1993

[54] STILL IMAGE RECORDING AND REPRODUCING APPARATUS

[75] Inventor: Tsuguhide Sakata, Tokyo, Japan

[73] Assignee: Canon Kabushiki Kaisha, Tokyo, Japan

[21] Appl. No.: 527,093

[22] Filed: May 22, 1990

[30] Foreign Application Priority Data

May 25, 1989 [JP] Japan .................................. 1-133286

[51] Int. Cl.$^5$ .......................... H04N 9/79; H04N 5/92
[52] U.S. Cl. ..................................... 358/310; 358/335
[58] Field of Search ................. 358/310, 906, 909, 335

[56] References Cited

U.S. PATENT DOCUMENTS 4,862,292 8/1989 Enari et al. ........................ 358/335
4,984,094 1/1991 Emori .................................. 358/335

Primary Examiner—Robert L. Richardson
Assistant Examiner—Huy Nguyen
Attorney, Agent, or Firm—Robin, Blecker, Daley & Driscoll

[57] ABSTRACT

A recording and reproducing apparatus is arranged to record one picture amount of an image signal in a plurality of recording tracks on a recording medium, to sample one picture amount of the image signal reproduced from the recording medium according to either a first sampling clock signal or a second sampling clock signal of a frequency lower than that of the first sampling clock signal, to store the sample signal, and to selectively output either the sample signal which is sampled on the basis of the first sampling clock signal and stored or the sample signal which is sampled on the basis of the second sampling clock signal and stored. This arrangement enables the operator to readily confirm the contents of the image signal recorded on the recording medium.

4 Claims, 14 Drawing Sheets

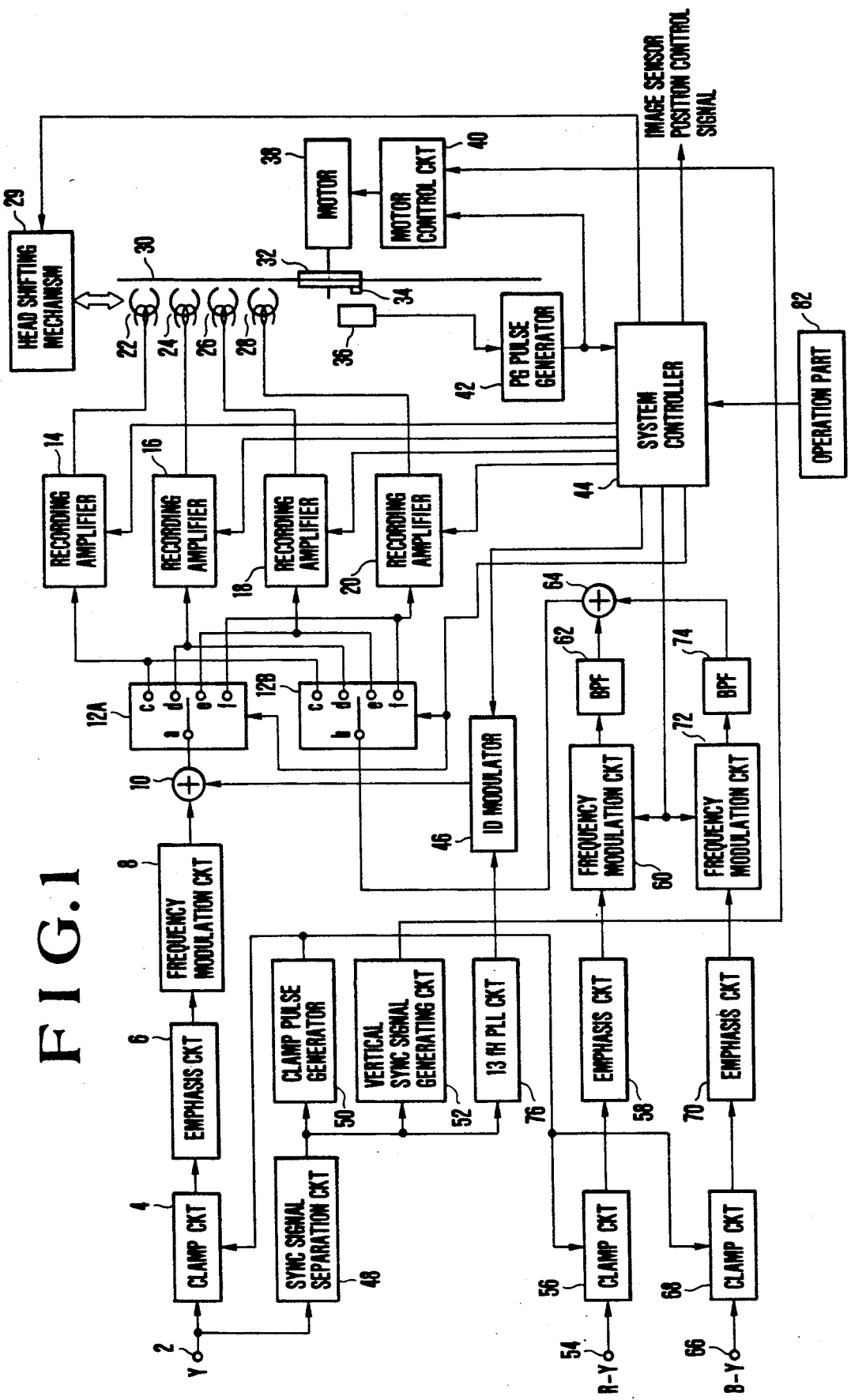
F I G. 1

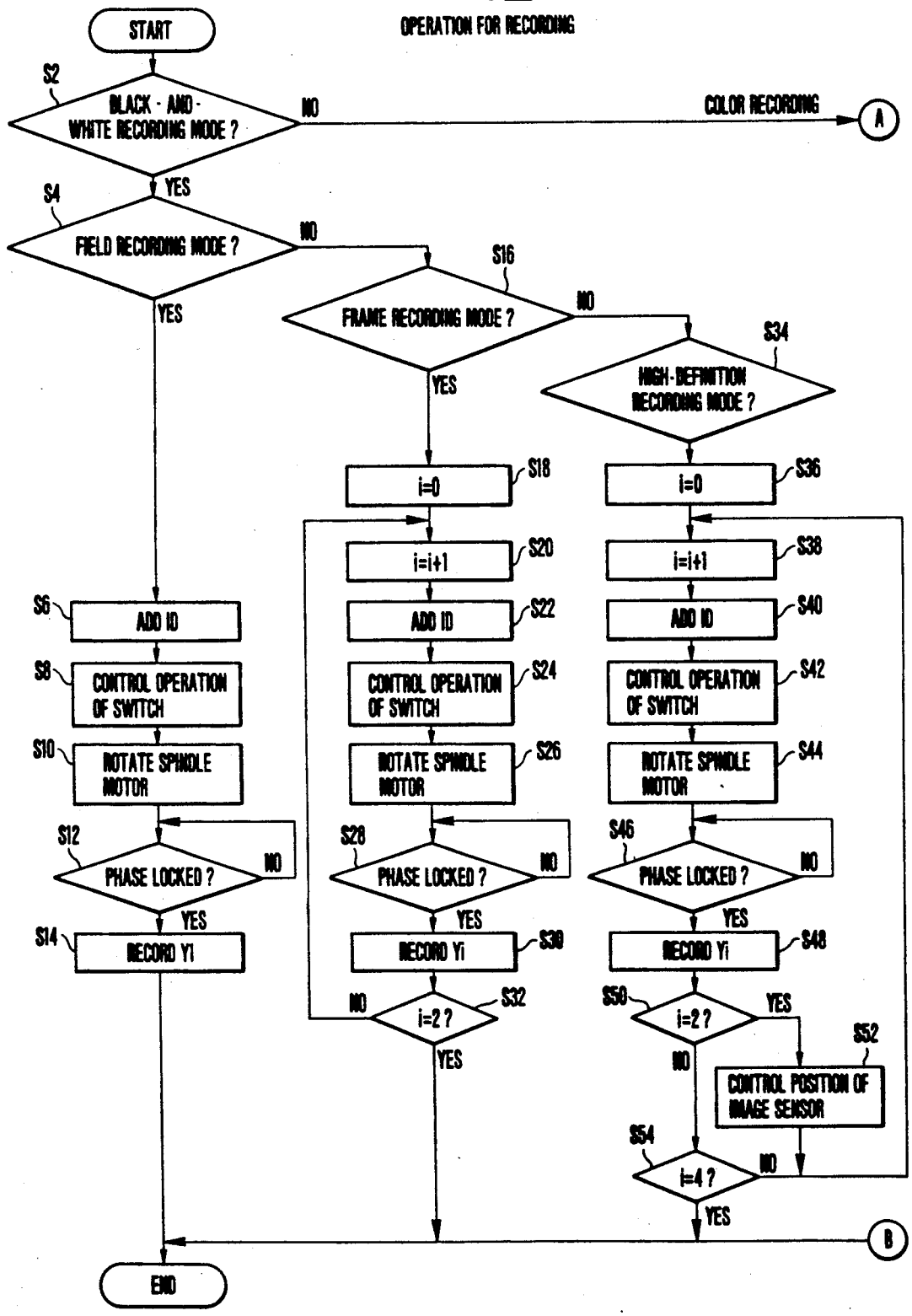
FIG.2(A) OPERATION FOR RECORDING

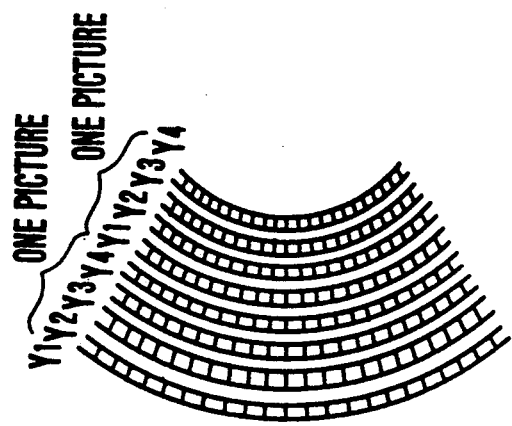
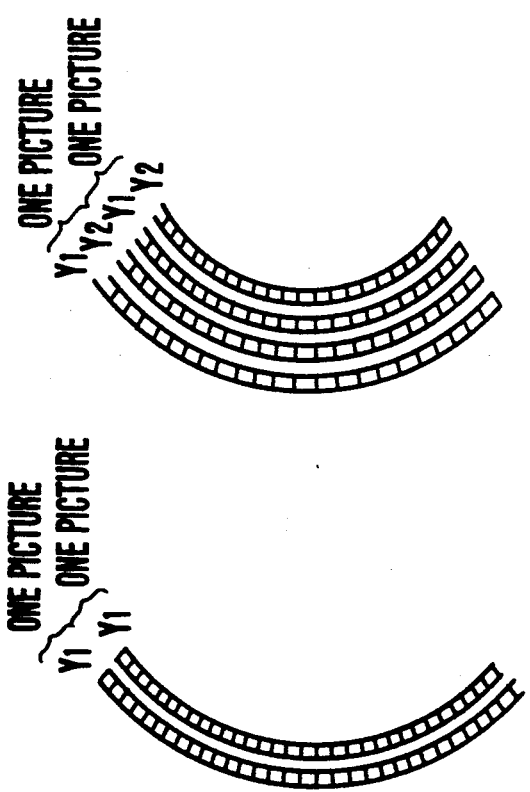
FIG.5(A) BLACK-AND-WHITE FIELD RECORDING MODE
FIG.5(B) BLACK-AND-WHITE FRAME RECORDING MODE
FIG.5(C) BLACK-AND-WHITE HIGH-DEFINITION RECORDING MODE

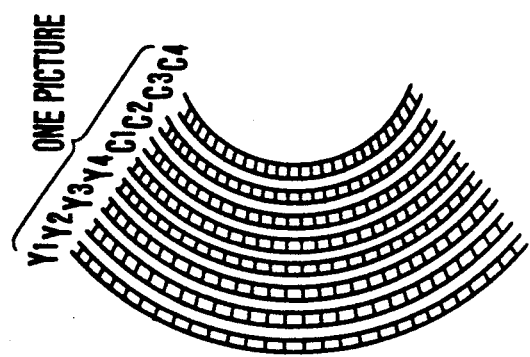
FIG.6(A) COLOR FIELD RECORDING MODE
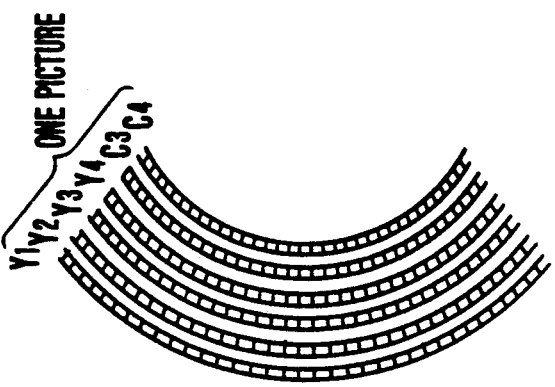
FIG.6(B) COLOR FRAME RECORDING MODE
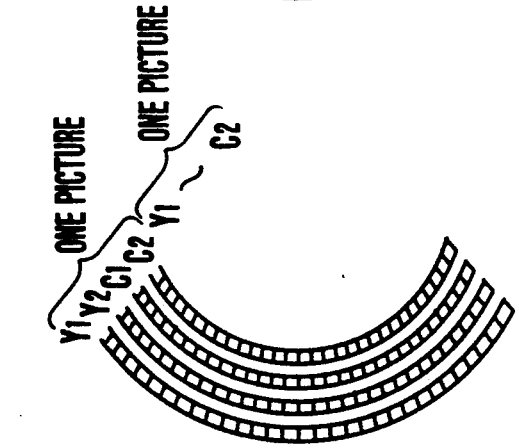
FIG.6(C) COLOR FIRST HIGH-DEFINITION RECORDING MODE (HR' RECORDING)
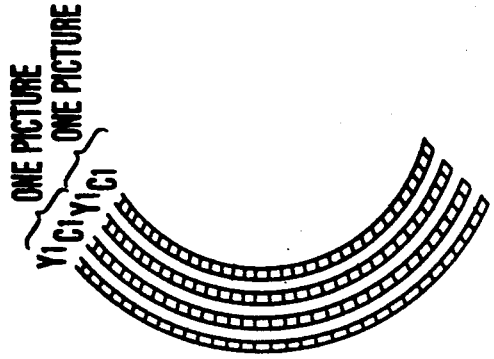
FIG.6(D) COLOR SECOND HIGH-DEFINITION RECORDING MODE (HR RECORDING)

FIG.8

RECORDING MODE DISCRIMINATION
CODE: TWO BITS
(ID FIELD/FRAME AREA)

| | | | A | B |
|---|---|---|---|---|
| FIELD RECORDING MODE | | | 0 | 0 |
| FRAME RECORDING MODE | OUTER TRACK | | 0 | 1 |
| | INNER TRACK | | 1 | 0 |
| FIRST/SECOND HIGH-DEFINITION RECORDING MODE | OUTER FRAME | OUTER TRACK | 1 | 1 |
| | | INNER TRACK | 1 | 0 |
| | INNER FRAME | OUTER TRACK | 0 | 1 |
| | | INNER TRACK | 1 | 0 |

OPERATION FOR REPRODUCTION

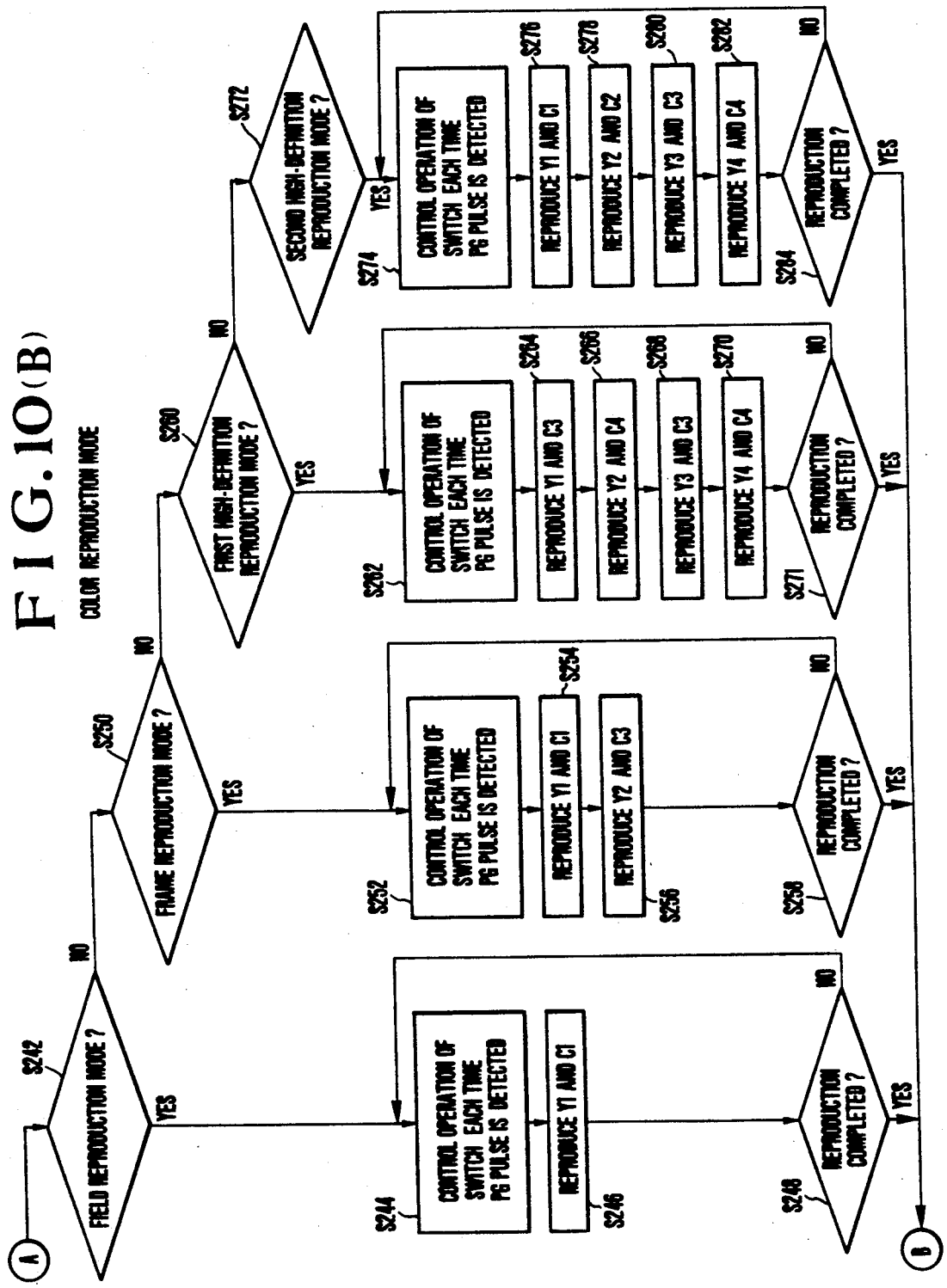

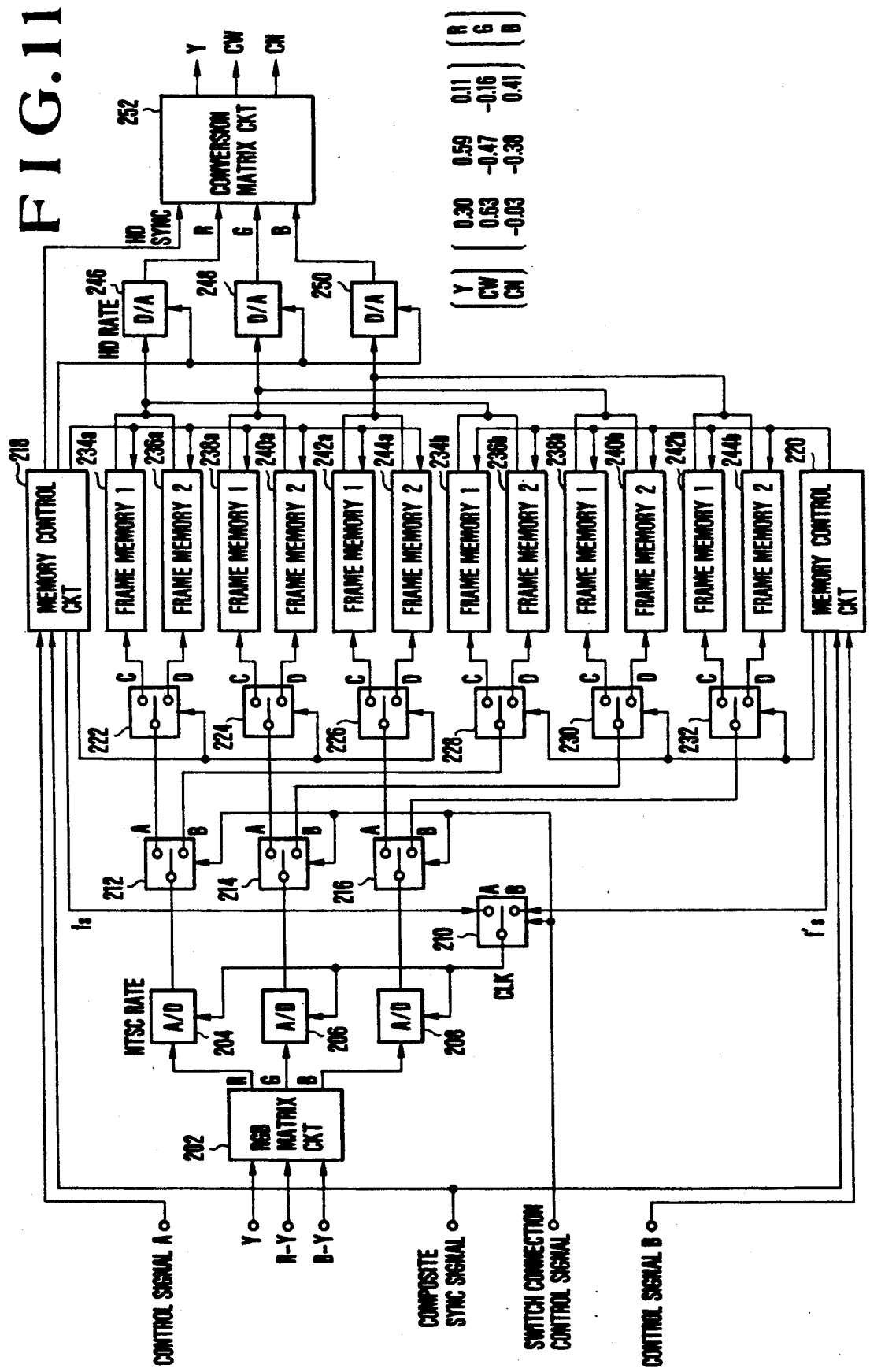

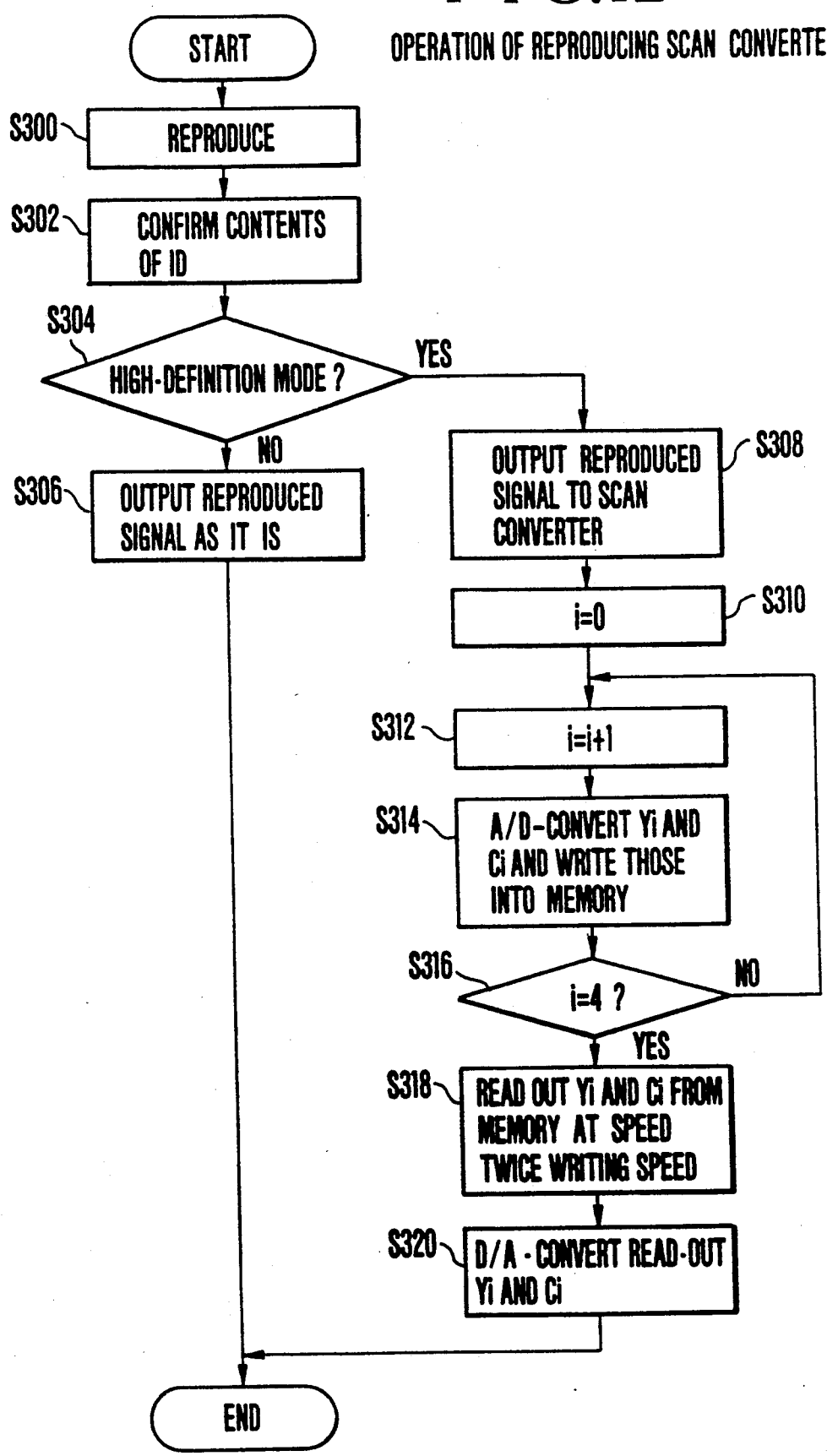

STILL IMAGE RECORDING AND REPRODUCING APPARATUS

BACKGROUND OF THE INVENTION

1. Field of the Invention

This invention relates to a recording and reproducing apparatus for recording and reproducing an image signal on and from a recording medium.

2. Description of the Related Art

The known recording and reproducing apparatuses for recording and reproducing image signals on and from a recording medium such as a magnetic disc or the like include, for example, a still video apparatus.

The still video apparatus is arranged to record and reproduce an image signal in the following manner: the image signal is separated into a luminance signal and color-difference signals of two kinds. The separated signals are frequency-modulated. After that, the color-difference signals of the two kinds are alternately frequency-multiplexed with the luminance signal by switching them from one over to the other for every horizontal synchronizing (hereinafter referred to as sync) period. In other words, they are converted into a color-difference line-sequential signal for recording and reproduction.

However, the above-stated recording method of the still video apparatus has the following problems:

(1) The luminance signal (hereinafter referred to as signal Y) and the color-difference signals (hereinafter referred to as signals R-Y and B-Y) are frequency-modulated and frequency-multiplexed before recording. Therefore, if the band of the luminance signal is increased up to 7 to 8 MHz or thereabout, it would exceed a frequency band recordable on a magnetic recording medium. At present, therefore, the luminance signal band is limited to 4.5 MHz or thereabout.

(2) The frequency multiplex recording of the signal Y and the signal R-Y or B-Y after their frequency modulation tends to cause a mixed modulation distortion between the signal Y and the signal R-Y or B-Y. With the frequency modulation carrier frequency of the signal Y expressed as fy (MHz) and that of the signal R-Y or B-Y as fc (MHz), for example, a frequency distortion which is expressed as follows particularly presents a serious problem: fy - fc, fy - 2fc (3) Further, due to a restriction imposed by the TV system, the resolution of the signal Y, i.e., the number of scanning lines, in the vertical direction is limited to 525. Then, since the signals R-Y and B-Y are frequency-multiplexed with the Y signal for recording, the color resolution in the vertical direction is also low.

SUMMARY OF THE INVENTION

It is a general object of this invention to provide a recording and reproducing apparatus which is capable of solving the above-stated problems.

It is a more specific object of the invention to provide a recording and reproducing apparatus which is capable of readily discriminating the contents of an image signal recorded on a recording medium.

Under this object, a recording and reproducing apparatus which is arranged according to this invention to record, on a recording medium, one picture amount of an image signal composed of a luminance signal and a chrominance signal and to reproduce the luminance and chrominance signals from the recording medium comprises: recording means for recording at least one of the luminance and chrominance signals in a plurality of recording tracks on the recording medium; storing means for reproducing one picture amount of the luminance signal from recording tracks in which the luminance signal is recorded on the recording medium, for sampling the reproduced luminance signal on the basis of either a first sampling clock signal or a second sampling clock signal of a lower frequency than that of the first sampling clock signal to obtain a sample signal and for storing the sample signal; and output means for selectively outputting either the sample signal obtained by sampling on the basis of the first sampling clock signal and stored by the storing means or the sample signal obtained by sampling on the basis of the second sampling clock signal and stored by the storing means.

It is another object of the invention to provide a recording and reproducing apparatus which is capable of readily detecting whether or not an image signal recorded on the recording medium has a high degree of resolution.

Under this object, a recording and a reproducing apparatus which is arranged according to this invention to record an image signal on a recording medium and to reproduce an image signal recorded on the recording medium comprises: recording means for recording on the recording medium either a first image signal or a second image signal which has a higher degree of resolution than the first image signal; storing means for reproducing an image signal recorded on the recording medium, for sampling the reproduced image signal on the basis of a first sampling clock signal when the reproduced image signal is the first image signal and on the basis of a second sampling clock signal which has a lower frequency than the first sampling clock signal when the reproduced image signal is the second image signal to obtain a sample signal and for storing the sample signal; and means for forming a reduced-size image signal by using the sample signal stored by the storing means.

The above and further objects and features of this invention will become apparent from the following detailed description of embodiments thereof taken in connection with the accompanying drawings.

BRIEF DESCRIPTION OF THE DRAWINGS

FIG. 1 is a block diagram showing a recording apparatus to which this invention is applied. FIG. 2(A), 2(B) and 2(C) are flow charts showing the operation of the recording apparatus shown in FIG. 1. FIGS. 5(A), 5(B) and 5(C) show the formation of tracks in a black-and-white recording mode. FIGS. 6(A) to 6(D) show the formation of tracks in a color recording mode. FIG. 8 shows recording mode discrimination codes. FIGS. 10(A) and 10(B) are flow charts showing the operation of the reproducing apparatus shown in FIG. 9. FIG. 11 is a block diagram showing a scan converter to be used in a high-definition reproducing mode. FIG. 12 is a flow chart showing the operation of the scan converter shown in FIG. 11.

DETAILED DESCRIPTION OF THE PREFERRED EMBODIMENT

Figure 2B:
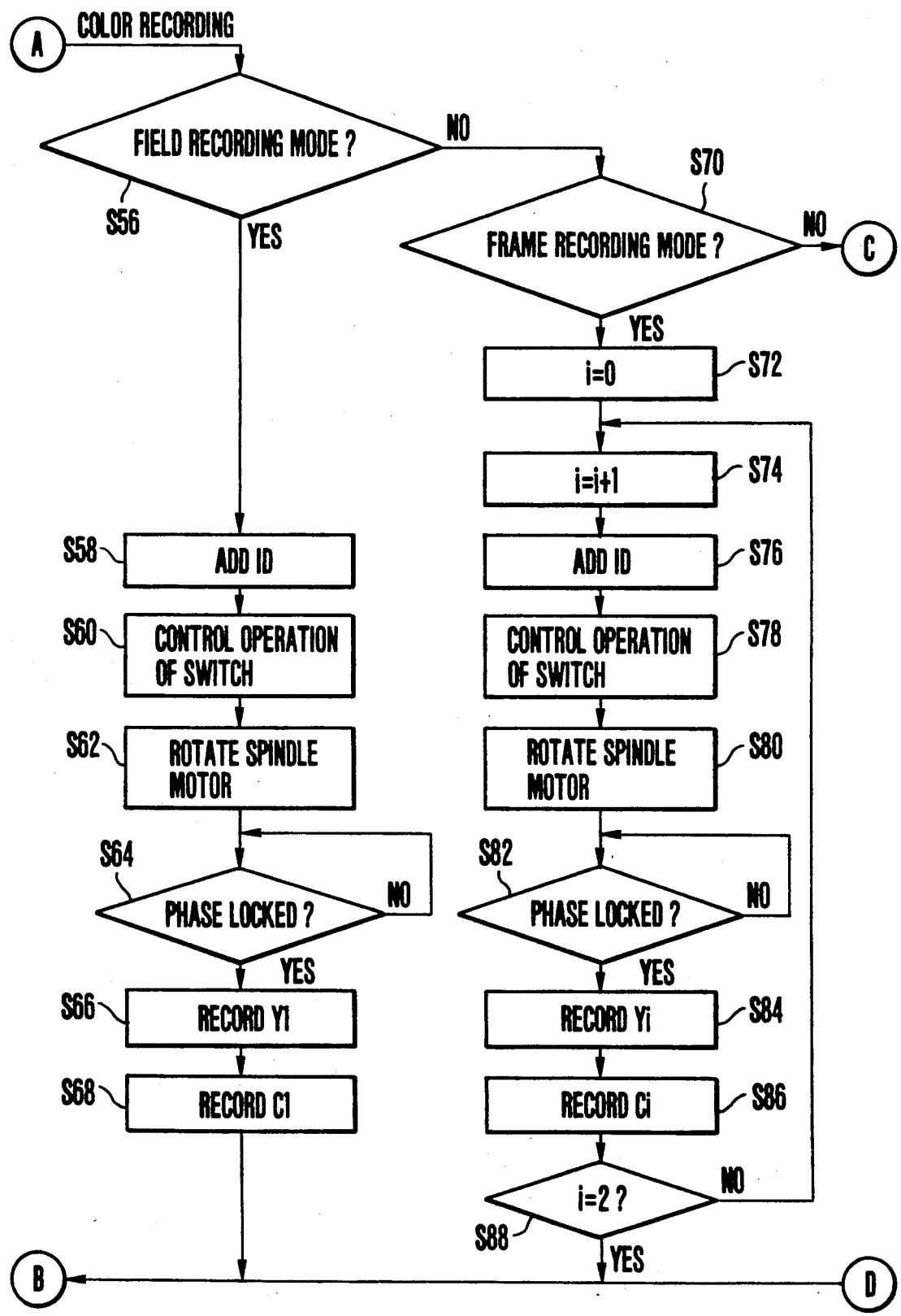

The details of this invention are described below through an embodiment thereof:

FIG. 1 is a block diagram showing the recording system of a still video apparatus to which this invention is applied as the embodiment of this invention. The illustration includes a luminance signal input terminal 2; a clamp circuit 4; an emphasis circuit 6; a frequency modulation circuit 8; an adder 10 which is arranged to multiplex an ID signal which will be described later with a luminance signal which is frequency-modulated; change-over switches 12A and 12B; recording amplifiers 14, 16, 18 and 20; magnetic heads 22, 24, 26 and 28; a head shifting mechanism 29; a disc-shaped magnetic recording medium (or a magnetic disc) 30; a center core 32 disposed on the magnetic disc 30; a PG pin 34 which is provided on the center core 32 for the purpose of detecting the rotation phase of the magnetic disc 30; a PG coil 36 which is arranged to detect the position of the PG pin 34 by utilizing an electromagnetic induction effect; a spindle motor 38 for rotating the magnetic disc 30; a spindle motor control circuit 40 which is arranged to control the rotating speed and phase of the magnetic disc 30 according to the vertical sync signal of an input video signal and a PG pulse; and a PG pulse generator 42 which is arranged to generate the PG pulse at a given level by introducing a weak PG pin detection signal produced as a result of detection by the PG coil 36. A system controller 44 is arranged to control the switching actions of the change-over switches 12A and 12B, and the operations of the recording amplifiers 14, 16, 18 and 20. An ID modulator 46 is arranged to modulate in a given manner the recording carrier of an ID signal (will be described in detail later) on the basis of recording mode data obtained from the system controller 44. A sync signal separation circuit 48 is arranged to separate a composite sync signal from the luminance signal in which the composite sync signal is included. The illustration further includes a clamp pulse generator 50; a vertical sync signal generating circuit 52; an input terminal for receiving a color-difference signal R-Y; a clamp circuit 56; an emphasis circuit 58; a frequency modulation circuit 60; a band-pass filter (hereinafter referred to as BPF) 62 for passing only a given band of the signal R-Y which is frequency-modulated; an input terminal for receiving a color-difference signal B-Y; a clamp circuit 68; an emphasis circuit 70; a frequency modulation circuit 72; a BPF 74 for passing only a given band of the signal B-Y which is frequency-modulated; an adder 64 which is arranged to frequency-multiplex the frequency-modulated signals R-Y and B-Y; and a PLL circuit 76 arranged to generate an ID carrier having a frequency which is 13 times as high as a horizontal sync frequency.

Figure 2C:
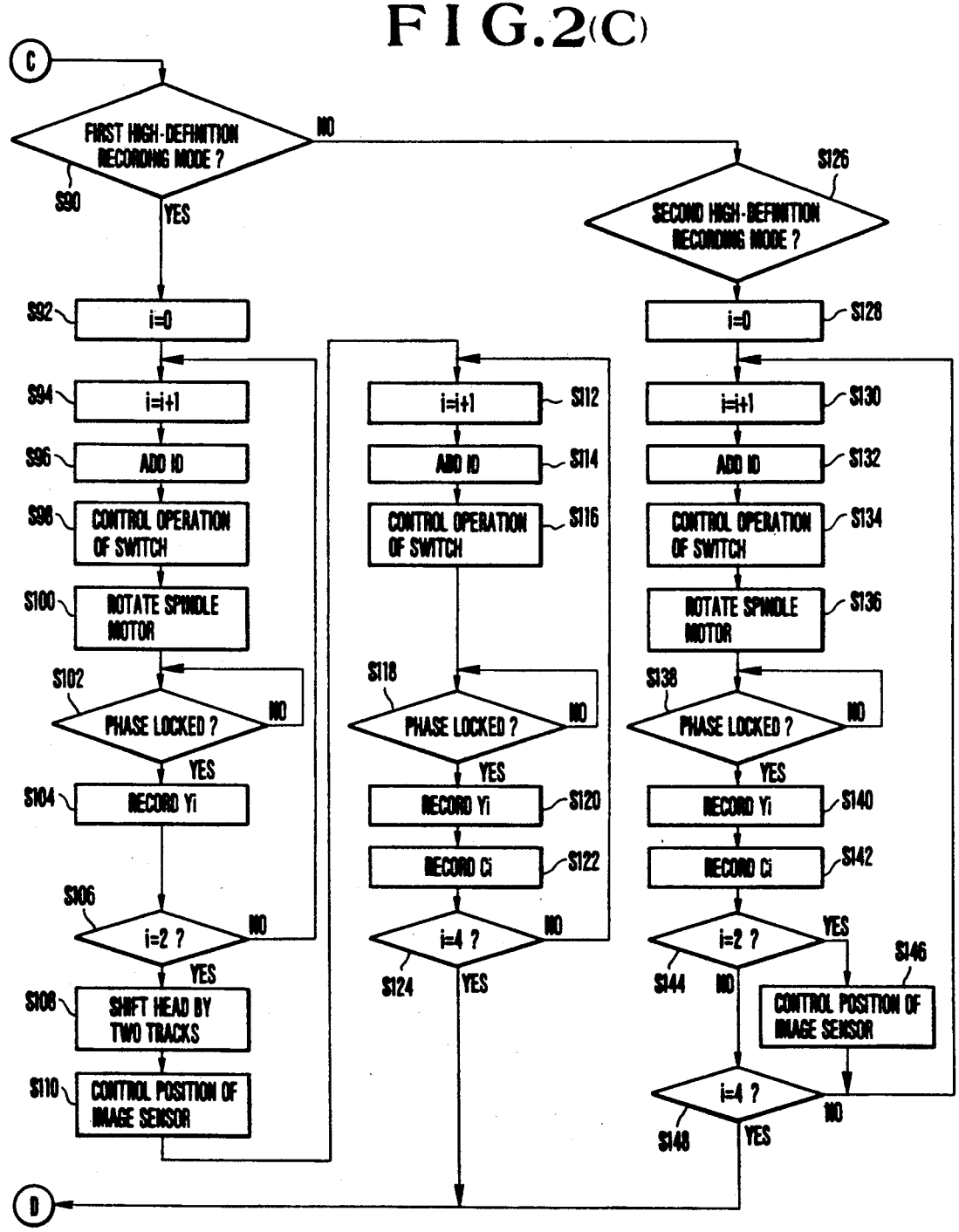

FIGS. 2(A) to 2(C) are flow charts including steps S2 to S148 which show the operation of the recording system arranged as shown in FIG. 1. The recording system operates as described below with reference to these flow charts and other drawings:

The embodiment is capable of recording a video signal which is either a composite video signal such as the TV signal of the NTSC system or a component video signal such as an RGB signal. In the following description, however, the embodiment is assumed to receive a luminance signal Y which has been processed to include a composite sync signal and color-difference signals R-Y and B-Y, to record these signals and to reproduce them.

Figure 3A:
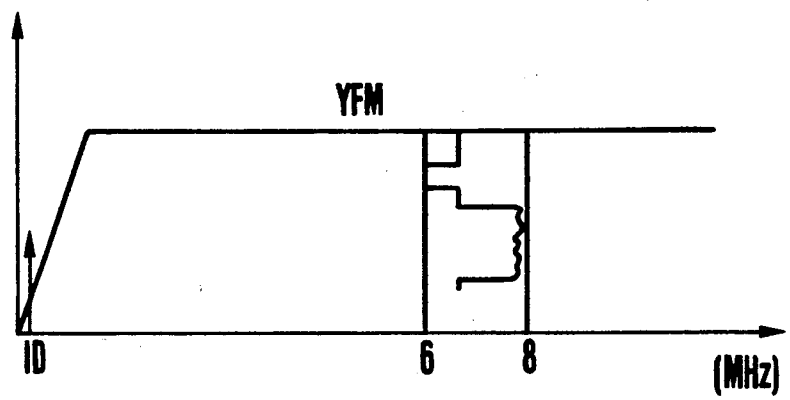
FIGS. 3(A) and 3(B) show the distribution of bands of signals.

As mentioned in the foregoing, the luminance signal Y is received at the input terminal 2. The signal Y is then clamped by the clamp circuit 4. The clamped luminance signal Y is subjected to an emphasis process and is then frequency-modulated by the frequency modulation circuit 8. At this time, frequency allocation is made, for example, in conformity to the specifications for a still video floppy disc of the EIAJ, as follows: referring to FIG. 3(A), a sync tip is set at 6 MHz and a white peak at 7.5 MHz. The frequency modulation gives interchangeability with the conventional system. It also obviates the necessity of frequency-multiplexing a color information signal and the necessity of removing a side band by means of a BPF, etc.. The band obtained after modulation is wider than the band obtainable by the conventional system. Further, if the interchangeability with the conventional system is not required, the modulation process can be arranged to give still wider band for a higher degree of horizontal resolution of the luminance signal.

The frequency-modulated signal thus obtained is sent to the adder 10, at which an ID signal conforming to the above-stated specifications for a still video floppy disc is frequency-multiplexed with the luminance signal.

Figure 4:
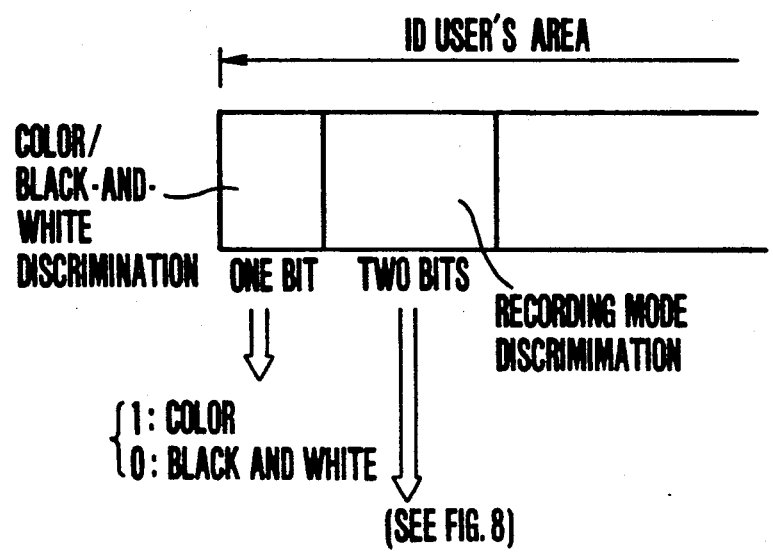
FIG. 4 shows a user's area provided for the operator within an ID signal multiplexed with a luminance signal.

Further, to the user's area of the above-stated ID signal is assigned a discrimination code of 3 bits. Referring to FIG. 4, this code consists of one bit for a discrimination between a black-and-white signal and a color signal and two bits for discriminating between recording modes. More specifically, the color signal is indicated by "1" and the black-and-white signal by "0". With respect to the recording mode discriminating bits, "00" indicates a field recording mode; "01" a frame recording mode; "10" a first high-definition recording mode (will be described later); and "11" a second high-definition recording mode (will be described later).

In the black-and-white recording mode, the embodiment operates as described below with reference to the above-stated flow chart:

Steps S2 and S4: in carrying out the black-and-white recording in the field recording mode, the operator operates the operation part 82 to instruct the system controller 44 (see FIG. 1) to come into the field recording mode. In response to this, the system controller 44 instructs the ID modulator 46 to modulate the ID carrier output from the PLL circuit 76 in such a way as to set, in the user's area (FIG. 4) of the ID signal, the code "00" which indicates the field recording mode (see FIG. 8). At a step S6: the adder 10 multiplexes the ID signal with the frequency-modulated luminance signal. At a step S8: the change-over switch 12A is controlled to connect the contacts "a" and "c" of the switch to each other. Meanwhile, the frequency modulation circuits 60 and 72 which are provided for the color-difference signals are muted. The flow of operation then waits for an instruction for the start of recording.

When the instruction is given through the operation part 82 by the operator for the start of recording, the system controller 44 sends a recording gate signal to the recording amplifier 14. At a step S14: then, one field amount of the luminance signal Y is recorded in one track on the magnetic disc 30 by keeping a given phase relation to the PG pin 34. It is assumed that, before recording, a still video floppy disc container which contains the magnetic disc 30 therein has already been loaded on the body of the system. Further, at steps S10 and S12, an input vertical sync signal which is obtained, via the sync signal separation circuit 48 and the vertical sync signal generating circuit 52, from the luminance signal received at the luminance signal input terminal 2 is compared with the PG pulse which is obtained from the PG detection coil 36 and the PG pulse generator 42. The spindle motor 38 is driven by the spindle motor control circuit 40 in such a way as to cause the magnetic disc 30 to rotate at a given rotational frequency. It is thus assumed that, as a result of this, the magnetic disc 30 is rotating at the given rotational frequency.

After one track (or one field) amount of the luminance signal is recorded, the recording track pattern on the magnetic disc 30 becomes as schematically shown in FIG. 5(A). In FIG. 5(A), a recording track Y1 on the outer side represents the track pattern formed by the recording action described above. If, recording is further performed for a second field in the black-and-white field recording mode, another track amount of the luminance signal is recorded in a second track on the inner side of the first track as shown in FIG. 5(A).

Next, a black-and-white frame recording mode is described as follows: at the steps S2, S4 and S16 of FIG. 2(A), the operator also operates the operation part 82 to instruct the system controller 44 to come into the black-and-white recording mode. Steps S18, S20 and S22: the system controller 44 instructs the ID modulator 46 to modulate the ID carrier output from the PLL circuit 76 to set, in the ID signal, a code "01" indicating a track on the outer side (see FIG. 8). The ID signal thus modulated is multiplexed at the adder 10 with the frequency-modulated luminance signal. Step S24: the change-over switch 12A is controlled to connect its contact "a" to its contact "c". The flow of operation then waits for an instruction for the start of recording.

When the operator gives instructions for the start of recording through the operation part 82, the flow comes to a step S26. At steps S26 and S28, the system controller 44 controls the spindle motor 38 to rotate at a given speed. At a step S30, a recording gate signal is sent to the recording amplifier 14 to have a first field (Y1) recording performed on the magnetic disc 30. Steps S32, S20 and S22: upon completion of recording, the system controller 44 again instructs the ID modulator 46 to modulate the ID carrier output from the PLL circuit 76 in such a way as to set, in the user's area of the ID signal, a code "10" which indicates a track on the inner side in the frame recording mode (see FIG. 8). Then, the modulated ID signal is multiplexed with the frequency-modulated luminance signal at the adder 10.

Next, at the step S24, the system controller 44 causes the change-over switch 12A to connect its contact "a" to its contact "d". By this time, the spindle motor 38 has already come to rotate at the given speed. At the steps S26, S28 and S30, therefore, the recording gate signal is immediately sent to the recording amplifier 16, and the recording is continuously performed for the second field (Y2). As a result of this, the recording track pattern formed on the magnetic disc 30 comes to include tracks Y1 and Y2 from its outer side as shown in FIG. 5(B).

When the recording is performed in the black-and-white frame recording mode for the second frame, another pair of tracks Y1 and Y2 is newly formed on the inner side of the two recording tracks as shown in FIG. 5(B). In performing the recording for the second frame, the position of the magnetic heads 22 and 24 is at first shifted by means of the head shifting mechanism 29, and the same recording amplifiers 14 and 16 are used as in the case of recording for the first frame. However, this arrangement may be changed to use third and fourth magnetic heads 26 and 28 and the corresponding recording amplifiers 18 and 20 without shifting the magnetic heads 22 and 24.

In performing the black-and-white recording in the high-definition recording mode, the embodiment operates as follows: at steps S2, S4, S76 and S34 the operator operates the operation part 82 to inform the system controller 44 of the selection of this recording mode. Steps S36, S38 and S40: the system controller 44 instructs the ID modulator 46 to modulate the ID carrier output from the PLL circuit 76 in such a way as to have the code 11 which indicates this mode which indicates this mode set in the user's area of the ID signal. The ID signal is then multiplexed with the frequency-modulated luminance signal by the adder 10. At a step S42: the system controller 44 controls and causes the change-over switch 12A to connect its contact "a" to its contact "c". The flow of operation then waits for an instruction for the start of recording.

Steps S44 and S46: when the operator gives instructions for the start of recording by means of the operation part 82, the system controller 44 causes the spindle motor 38 to rotate at a given speed. Step S48: the recording gate signal is sent to the first recording amplifier 14 to perform the recording for the first field (Y1) on the magnetic disc 30.

Step S40: after completion of this recording action, the system controller 44 instructs the ID modulator 46 to change the recording mode discriminating two-bit code (see FIG. 8) of the user's area of the ID signal to "10". Step S42: the contact "a" of the change-over switch 12A is connected to its contact "d". Steps S44, S46 and S48: immediately after that, the recording gate signal is sent to the second recording amplifier 16 to perform the recording for the second field (Y2).

Steps S50 and S52: after completion of recording for the second field (Y2). the system controller 44 performs position control over an image sensor in a manner as will be described later with reference to FIG. 7(A). Steps S38 and S40: following this, the system controller 44 instructs the ID modulator 44 to change the recording mode discriminating two-bit code of the user's area of the ID signal to a code "01" (see FIG. 8). Step S42: the contact "a" of the change-over switch 12A is connected to the contact "e" of the switch. Step S48: recording is performed for a third field through the third recording amplifier 18 and the magnetic head 26.

Steps S54, S38 and S40: recording for a fourth field is likewise performed. More specifically, the ID modulator 46 is instructed to change the recording mode discriminating two-bit code of the user's area of the ID signal to a code "10" (see FIG. 8). Step S42: the contact "a" of the change-over switch 12A is connected to another contact "f" of the switch. Steps S44, S46 and S48: the fourth field recording is carried out by using the recording amplifier 20 and the magnetic head 28.

Further, in recording for the third and fourth fields, it is possible that the magnetic heads are shifted by the head shifting mechanism 29 to have the magnetic heads 22 and 24 which are used for the first and second fields also used for the third and fourth fields.

Figure 7A:
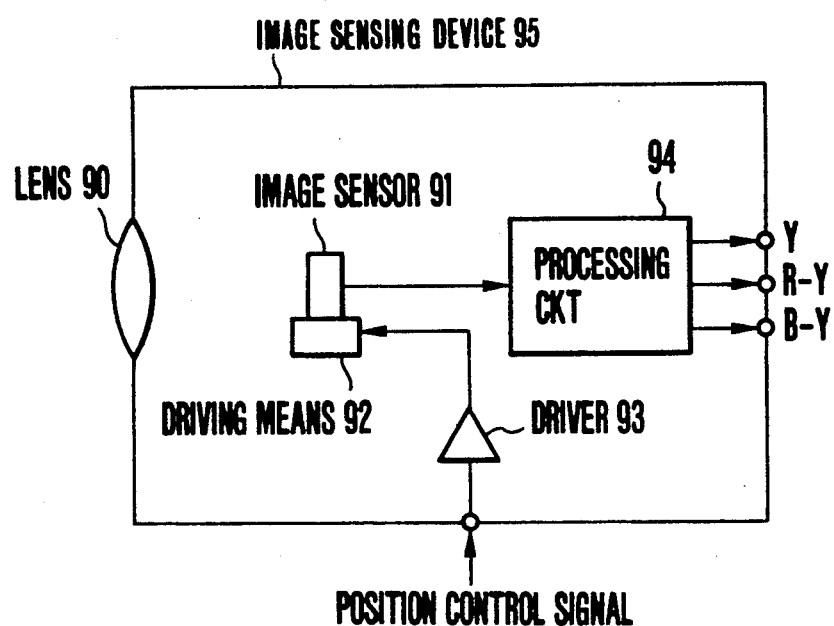
FIGS. 7(A) and 7(B) show a high-definition recording mode.
Figure 7B:
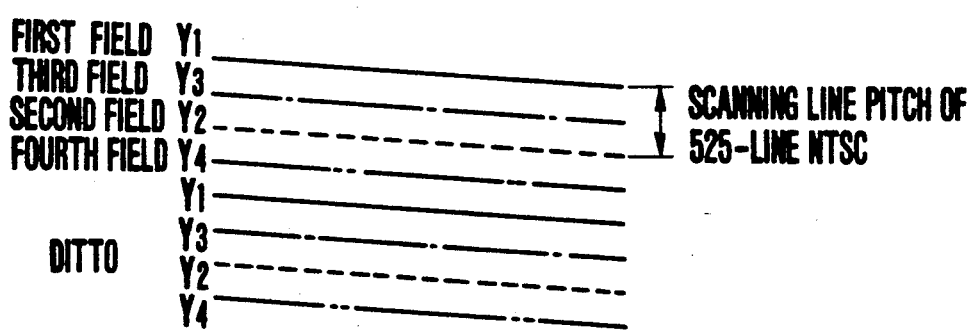

Referring now to FIGS. 7(A) and 7(B), the operation of the embodiment in the high-definition recording mode is described as follows:

Compared with the TV signal of the NTSC system which has 525 scanning lines, for example, the resolution in the vertical direction is increased by two times in the high-definition recording mode. For this purpose, the pitch of 525 scanning lines in one frame is shifted as much as ½ of the pitch either upward or downward with respect to another frame, and two frames of picture thus obtained are combined with each other. More specifically, as shown in FIG. 7(B); the first frame which consists of first and second fields and the second frame which consists of third and fourth field are respectively arranged to have their scanning line pitches shifted to the extent of ½ pitch upward or downward to obtain the vertical resolution by about 1000 lines.

FIG. 7(A) schematically shows an image sensing device which is arranged to permit the above-stated high-definition recording. Referring to FIG. 7(A), a driving means 92 (a bimorph element, for example) is arranged to shift an image sensor 91 which is a CCD or the like to an extent corresponding to ½ of a scanning line pitch in response to a position control signal output from the system controller 44. As described in the foregoing in respect of the step S52 of FIG. 2(A), in recording in the high-definition recording mode, this position control signal is output from the system controller 44 before recording for the third and fourth fields and after the end of recording for the second field.

FIG. 5(C) shows a recording pattern obtained in a case where the black-and-white recording is performed in the high-definition recording mode. As apparent from this drawing, four tracks as counted from the outer side represent a recording pattern obtained in the manner described above. Therefore, when the black-and-white recording is performed further in the high-definition recording mode for a second picture, four tracks are formed on the inner side of the four outer side tracks.

Next, in a color recording mode, the embodiment operates as follows: when the operator designates the color recording mode through the operation part 82, the system controller 44 cancels the mute state of the color signal frequency modulation circuits 60 and 72. Therefore, the color-difference signals R-Y and B-Y which are received at the input terminals 54 and 66 are clamped respectively by the clamp circuits 56 and 68. Following this, the signals are supplied to the emphasis circuits 58 and 70 to be subjected to an emphasizing process and are then supplied to the frequency modulation circuits 60 and 72.

Figure 3B:
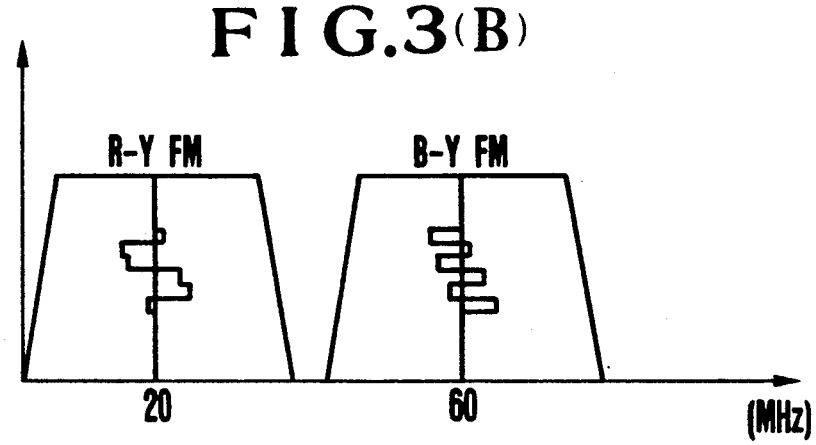

The signals R-Y and B-Y are frequency-modulated by the frequency modulation circuits 60 and 72. These signals are then supplied to the BPFs 62 and 74 (band-pass filters) to have their unnecessary band cut through the BPFs. The outputs of the BPFs are supplied to the adder 64 to be frequency-multiplexed into a multiplex color-difference signal. FIG. 3(B) shows the frequency distribution of the frequency-modulated color-difference signals R-Y and B-Y obtained within the multiplex color-difference signals thus formed.

The multiplex color-difference signal is supplied to the contact "b" of the change-over switch 12B.

Next, a color field recording mode of the embodiment is described below with reference to the flow charts of FIGS. 2(A), 2(B) and 2(C):

At steps S2 and S56: the operator designates the field recording mode through the operation part 82. Step S58: the system controller 44 instructs the ID modulator 46 to modulate the ID carrier output from the PLL circuit 76 in such a way as to set a given code in the user's area of the ID signal (see FIG. 8). Then, the ID signal is multiplexed by the adder 10 with the frequency-modulated luminance signal. In other words, the system controller 44 instructs the ID modulator 46 to set "1" as the color/black-and-white discrimination code (one bit) and "00" as the recording mode discrimination code (two bits).

Step S60: after the step S58, the contacts "a" and "b" of the change-over switches 12A and 12B are connected respectively to contacts "c" and "d". Steps S62 and S64: in response to instructions given by the operator for the start of recording, the system controller 44 causes the spindle motor 38 to rotate at a given speed. Steps S66 and S68: recording gate signals are supplied from the system controller 44 to the recording amplifiers 14 and 16. This causes the luminance signal and the multiplex color-difference signal to be recorded.

With the signals thus recorded on the magnetic disc 30 in the color field recording mode, a recording pattern is obtained as shown in FIG. 6(A). As shown, one luminance signal track and one color-difference signal track are located adjacent to each other. After the above-stated recording action, when the recording is further performed in the color field recording mode for a second field, another pair of a luminance signal track and a color-difference signal track are formed continuously on the inner side of the above-stated first pair of tracks.

Color recording in a frame mode is performed as follows: at steps S2, S56 and S70 the operator designates the color frame recording mode at the operation part 82. Steps S72, S74 and S76: the system controller 44 instructs the ID modulator 46 to modulate the ID carrier output from the PLL circuit 76 in such a way as to set the color/black-and-white discrimination code at "1" (for color) and the recording mode discrimination code at "01" (for an outer side track in the frame recording mode) in the user's area of the ID signal (see FIG. 8). The ID signal is then multiplexed by the adder 10 with the frequency-modulated luminance signal.

Step S78: after that, the change-over switches 12A and 12B are controlled and caused to connect their contacts "a" and "b" to contacts "c" and "e" respectively. Steps S78 and S80: when the operator instructs the system controller 44 to begin the recording action, the spindle motor 38 is caused to rotate at a given speed. Steps S84 and S86: the system controller 44 sends recording gate signals to the first and third recording amplifiers 14 and 18. As a result, the luminance signal and the multiplex color-difference signal of the first field are simultaneously recorded.

Steps S88, S74 and S76: upon completion of the above-stated recording action, the system controller 44 instructs the ID modulator 46 to change the recording mode discrimination code of the user's area of the ID signal to a code "10" for an inner track (see FIG. 8). Step S78: the change-over switches 12A and 12B are caused to connect their contacts "a" and "b" to the contacts "d" and "f" respectively. Steps S84 and S86: the recording gate signals are simultaneously sent to the second and fourth recording amplifiers 16 and 20. As a result, the luminance signal and the multiplex color-difference signal of the second field are simultaneously recorded.

FIG. 6(B) shows a recording pattern formed on the magnetic disc 30 as a result of the recording action. In the color frame recording mode described, the tracks Y1 and C1 (of the multiplex color-difference signal of the first field) are simultaneously recorded. After that, the tracks Y2 and C2 (of the multiplex color-difference signal of the second field) are also simultaneously recorded. In other words, these signals are recorded alternately and separately in every other track. This minimizes the adverse effect of the crosstalk between adjacent tracks.

In further recording the signals in the color frame recording mode for the second frame, the recording action is performed under the same control process to form four tracks on the inner side of the four tracks already formed on the magnetic disc.

Color recording in the first high-definition recording mode is performed in the following manner:

Steps S2, S56, S70 and S90: the operator sets the embodiment in the color first high-definition recording mode by operating the operation part 82. Steps S92, S94 and S96: the system controller 44 instructs the ID modulator 46 to modulate the ID carrier output from the PLL circuit 76 in such a way as to set, in the user's area of the ID signal, the color/black-and-white discrimination code at "1" (for color) and the recording mode discrimination code at "11" (for the outside track in the first high-definition recording mode—see FIG. 8).

Step S98: the change-over switch 12A is caused to connect its contact "a" to its contact "c". Steps S100 and S102: when the operator operates the operation part 82 to instruct the system controller 44 to start recording, the spindle motor 38 is caused to rotate at a given speed. When the rotating speed of the motor 38 reaches the given speed, the flow comes to a step S104. At the step S104: the system controller 44 sends a recording gate signal to the first recording amplifier 14 to have the luminance signal recorded in the track Y1 for the first field as shown in FIG. 6(C).

Steps S106, S94 and S96: upon completion of the recording for the first field, the ID modulator 46 is instructed to change the recording mode discrimination code to "10" (FIG. 8). Step S98: the contact "a" of the change-over switch 12A is connected to the contact "d". Steps S100, S102 and S104: a recording gate signal is sent to the second recording amplifier 16. As a result, the luminance signal for the second field is recorded in the track Y2 as shown in FIG. 6(C).

Step S108: after completion of recording the luminance signal for the second field, the system controller 44 instructs the head shifting mechanism 29 to move the magnetic head inward on the magnetic disc 30 to an extent corresponding to two tracks. Step S110: the system controller 44 then produces an image sensor position control signal as shown in FIG. 7(A). Then, as described in the foregoing with reference to FIG. 7(B), the second frame signals are recorded with the image sensor 91 set in a position which deviates to an extent corresponding to ½ of the scanning line pitch from the position of the first frame signals. Steps S112 and S114: then, the system controller 44 instructs the ID modulator 46 to change the above-stated recording mode discrimination code to "01" (see FIG. 8). Step S116: the contacts "a" and "b" of the change-over switches 12A and 12B are connected to their contacts "c" and "e" respectively.

Steps S118, S120 and S122: the system controller 44 then sends recording gate signals to the first and third recording amplifiers 14 and 18 respectively. As a result, the luminance signal and the multiplex color-difference signal for the first field of the second frame are simultaneously recorded in tracks Y3 and C3 as shown in FIG. 6(C) respectively. Steps S124, S112 and S114: after the tracks Y3 and C3 are formed, the system controller 44 instructs the ID modulator 46 to change the above-stated recording mode discrimination code to "10" (FIG. 8). Steps S114 and S116: the system controller 44 further causes the contacts "a" and "b" of the change-over switches 12A and 12B to be connected to the contacts "d" and "f" respectively. Steps S118, S120, S122 and S124: the system controller 44 sends recording gate signals to the second and fourth recording amplifiers 16 and 20. As a result, the luminance signal and the multiplex color-difference signal for the second field of the second frame are simultaneously recorded in tracks Y4 and C4 as shown in FIG. 6(C). A recording track pattern which is shown in FIG. 6(C) is formed on the magnetic disc 30.

Further, in the case of the above description, the color-difference signals C3 and C4 of the second frame are recorded. However, this may be changed to record the color-difference signals C1 and C2 of the first frame. In the case of the embodiment described, a multiple magnetic head of four channels is used. However, this may be changed to use a multiple head of eight channels. In that case, it is unncessary to move the magnetic head.

Next, color recording in the second high-definition recording mode is described as follows:

Steps S2, S56, S70, S90 and S126: the operator first designates color recording in the second high-definition recording mode through the operation part 82. Steps S128, S130 and S132: the system controller 44 instructs the ID modulator 46 to modulate the ID carrier output from the PLL circuit 76 in such a way as to have the color/black-and-white discrimination code of the user's area of the ID signal set at "1" (for color) and the recording mode discrimination code at "11" (for the outer side track of the outer side frame in the second high-definition recording mode—see FIG. 8). At the adder 10, the ID signal is multiplexed with the frequency-modulated luminance signal.

The following description of recording procedures is on the assumption that a multiple magnetic head of eight channels is employed:

Steps S134, S136, S138, S140 and S142: the codes in the user's area of the ID signal are set at "1" and "11" (see FIGS. 4 and 8). The luminance signal (track Y1) and the multiplex color-difference signal (track C1) for the first field of the first frame are simultaneously recorded. Steps S144, S148, S130, S132, S134, S136, S138, S140 and S142: The ID modulator 46 is instructed to change the recording mode discrimination code of the user's area of the ID signal to "10". Then, the luminance signal (track Y2) and the color-difference signal (track C2) for the second field of the first frame are simultaneously recorded. Steps S144, S146, S130, S132, S134, S136, S138, S140 and S142: the position of the image sensor is controlled (see FIG. 7(A)). The above-stated recordng mode discrimination code is changed to "01" (see FIG. 8). The luminance signal (track Y3) and the multiplex color-difference signal (track C3) for the first field of the second frame are simultaneously recorded.

In the last place, the ID modulator 46 is instructed to change the recording mode discrimination code to "10". Then, the luminance signal (track Y4) and the color-difference signal (C4) for the second field of the second frame are simultaneously recorded. As a result, a total of eight recording tracks are formed on the magnetic disc 30 as shown in FIG. 6(D).

Further, with respect to two-bit information on the field/frame area specified for the still video format by the EIAJ, the recording mode discrimination code is obtained by multiplexing, during the process of recording, the code shown in FIG. 8 with the frequency-modulated luminance signal. In other words, it is a feature of the code allotment of FIG. 8 that in addition to the specifications for the still video format, the embodiment provides two bit combinations (1, 1) for the first and second high-definition recording modes. This arrangement enables the embodiment to discriminate between the outer and inner tracks of the first frame and those of the second frame from one another.

Figure 9:
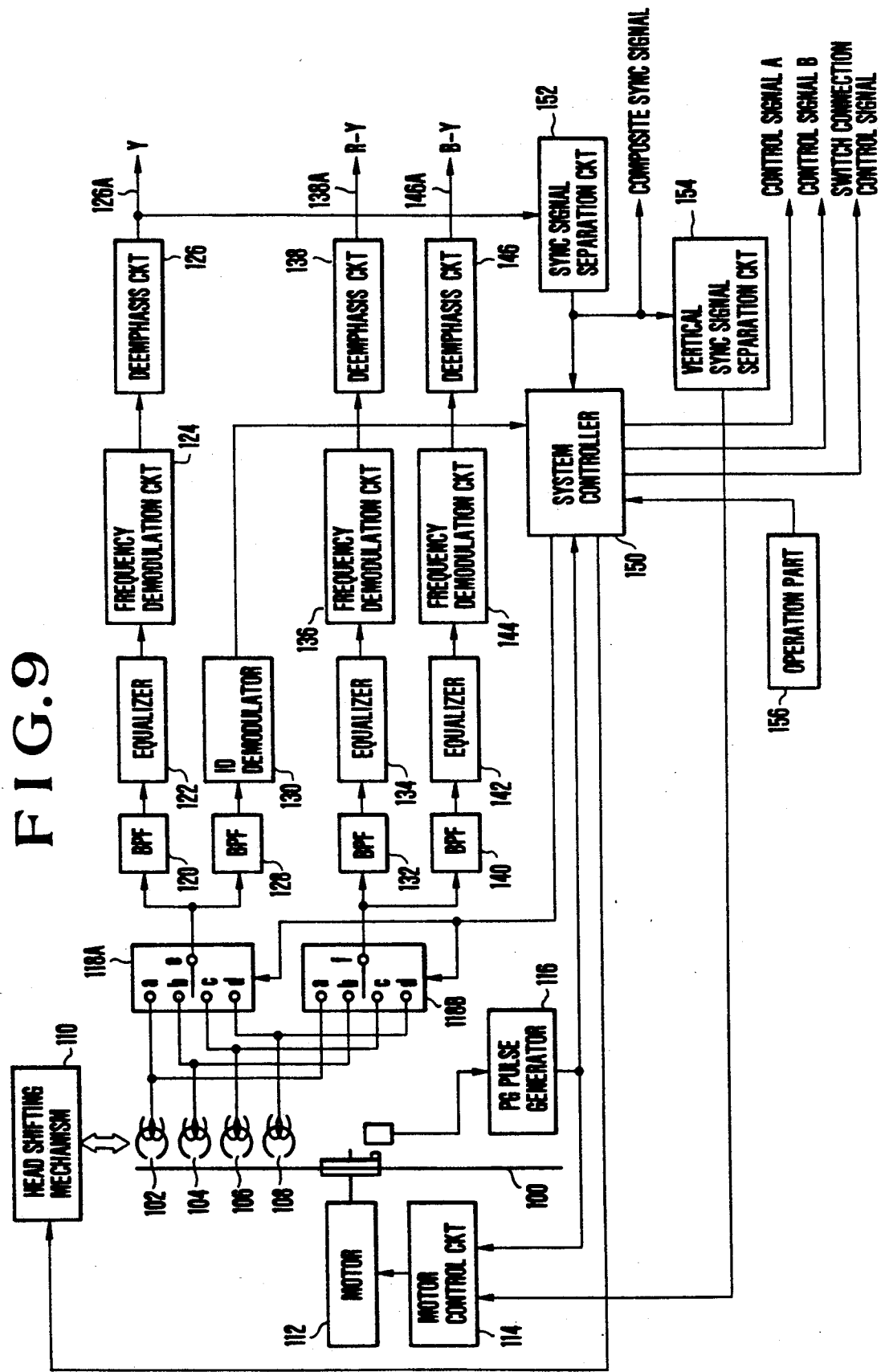
FIG. 9 is a block diagram showing a reproducing apparatus to which this invention is applied.

Next, the procedures for reproducing image signals from recording tracks formed on the magnetic disc as shown in FIGS. 5(A) to 5(C) and 6(A) to 6(D) are described below:

FIG. 9 is a block diagram showing the arrangement of the reproducing system of the embodiment. The illustration includes a magnetic disc 100; magnetic heads 102, 104, 106 and 108; a head driving mechanism 110; a spindle motor 112; a spindle motor control circuit 114; a PG pulse generator 116; change-over switches 118A and 118B; a band-pass filter (BPF) 128 which is arranged to pass a given band of a reproduced ID signal; an ID demodulator 130; a BPF 120 which is arranged to pass a given band of a reproduced frequency-modulated luminance signal; an equalizer 122; a frequency demodulation circuit 124; a deemphasis circuit 126 having a characteristic which is opposite to an emphasis characteristic for recording; a luminance signal output terminal 126A which is arranged to output a luminance signal to which a composite sync signal is added; a BPF 132 which is arranged to pass only a given band of a reproduced frequency-modulated color-difference signal R-Y; an equalizer 134; a frequency demodulation circuit 136; a deemphasis circuit 138; an output terminal 138A for outputting the signal R-Y; a BPF 140 which is arranged to pass only a given band of a reproduced frequency-modulated color-difference signal B-Y; an equalizer 142; a frequency demodulation circuit 144; a deemphasis circuit 146; an output terminal 146A for outputting the signal B-Y; a system controller 150; a sync signal separation circuit 152; a vertical sync signal separation circuit 154; and an operation part 156.

Figure 10A:
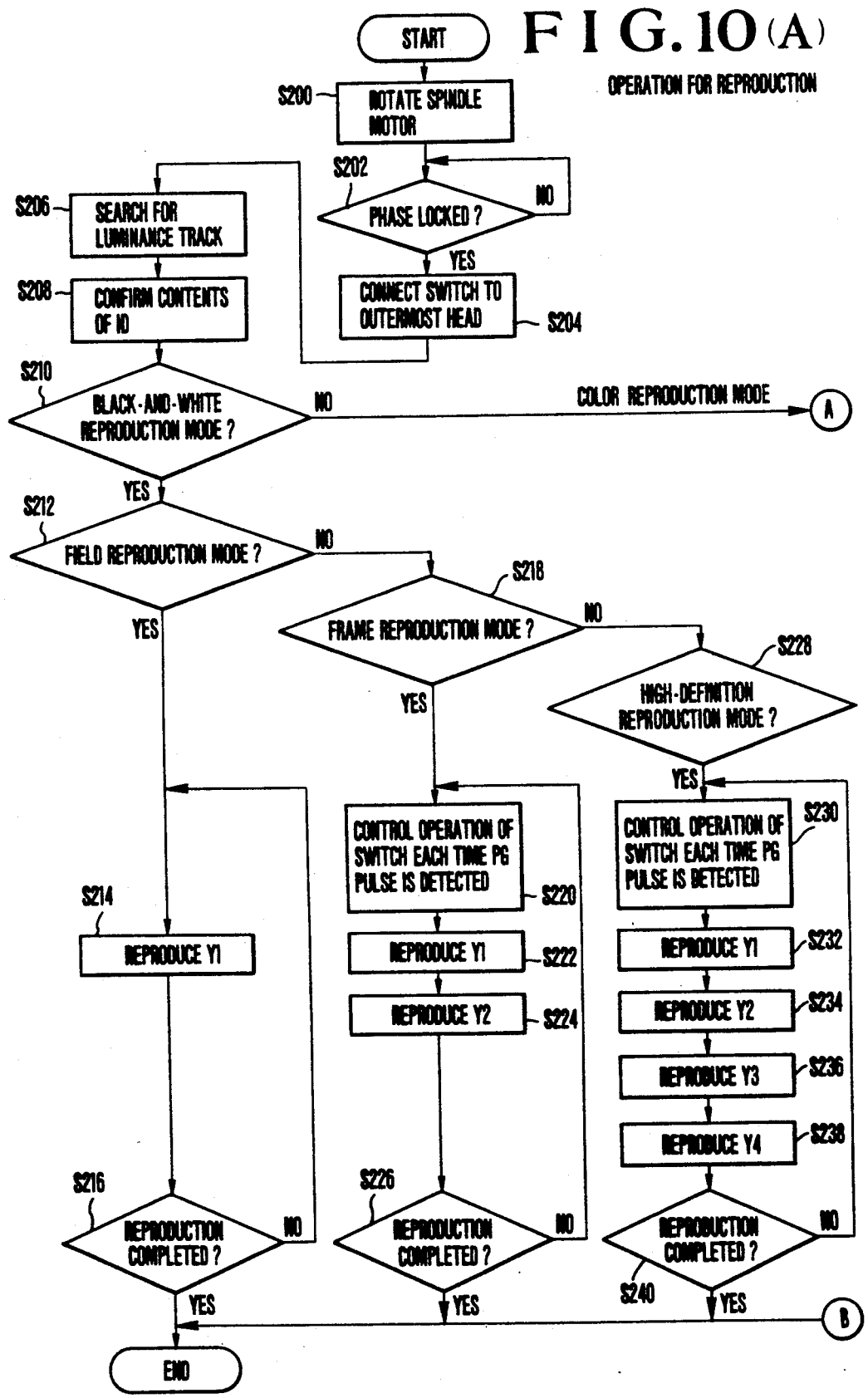

Referring to FIGS. 10(A) and 10(B) which are flow charts, the operation of the reproducing system of the embodiment is described as follows:

Steps S200 and S202: the magnetic disc 100 is first caused to rotate at a given rotational frequency. Steps S204 and S206: at first, the contact "a" of the change-over switch 118A is connected to a contact "e" of the same switch. This allows a reproducing action to be performed by the head 102 disposed in the outermost position. A track is found in which the frequency-modulated luminance signal, including a sync signal is recorded. To find the track having the record of the frequency-modulated luminance signal, a check is made for the presence or absence of the carrier of the reproduced ID signal.

Step S208: upon detection of the track in which the frequency-modulated luminance signal is recorded, the system controller 150 decodes the ID signal included in the track. In other words, an unnecessary band of the reproduced frequency-modulated luminance signal is removed by the BPF 128 and the reproduced ID signal alone is supplied to the ID demodulator 130. The ID demodulator 130 demodulates the ID signal into a discernible signal form before it is sent to the system controller 150. Then, the system controller 150 decodes the contents of the ID signal. In accordance with the contents of the ID signal thus decoded, the system controller 150 automatically sets one of the reproduction modes as follows:

(1) In a case where the recording mode discrimination code (see FIG. 8) is "00" which represents the field recording mode:

(1-1) If the color/black-and-white discrimination code is found to be "0", thus indicating the black-and-white recording mode; and (1-1-1) if the recording mode discrimination code is found to be "00", indicating the field recording mode at steps S210 and S212, the flow of operation comes to a step S214. Step S214: the contact "a" of the change-over switch 118A is kept connected with the contact "e", for the field reproduction mode. The frequency demodulation circuits 136 and 144 for a reproduced frequency-modulated multiplex color-difference signal are muted. Step S214: therefore the frequency-modulated luminance signal from which the unnecessary band is removed by the BPF 120 is demodulated by the frequency demodulation circuit 124 after it is subjected to a given correction process at the equalizer 122. The demodulated luminance signal is supplied to the deemphasis circuit 126 to be deemphasized. The deemphasized luminance signal is then output from the output terminal 126A.

Step S216: the black-and-white picture of the same field as the field obtained at the time of recording is reproduced by repeating the above-stated procedures.

(1-2) If the color/black-and-white discrimination code is found to be "1", thus indicating the color recording mode at the step S210; and (1-2-1) if the recording mode discrimination code is found to be "00", thus indicating the field recording mode at steps S210 and S242, the flow of operation comes to a step S244. Steps 244 and S246: the contacts "a" and "b" of the change-over switches 118A and 118B are connected to their contacts "e" and "f" respectively in synchronism with a PG pulse output from the PG pulse generator 116. Further, the frequency demodulation circuits 136 and 144 for the reproduced frequency-modulated multiplex color-difference signal are released from their mute state.

As a result of this, one field amount of the frequency-modulated luminance signal (track Y1) is reproduced in the same manner as described in the foregoing subparagraph (1-1-1). Meanwhile, one field amount of the frequency-modulated multiplex color-difference signal (track C1) is reproduced and its unnecessary bands are removed by the BPFs 132 and 140. The outputs of the BPFs 132 and 140 are subjected to predetermined correcting processes through the equalizers 134 and 142. The corrected color-difference signals thus obtained are demodulated by the frequency demodulation circuits 136 and 144. The demodulated signals are deemphasized by the deemphasis circuits 138 and 146 and are thus processed into color-difference signals R-Y and B-Y respectively. The signals R-Y and B-Y are output from the output terminals 138A and 146A respectively.

Step S216: with these actions repeated, a field color image signal of the same color as the color obtained at the time of recording is reproduced.

(2) In a case where the recording mode discrimination code is "01" (indicating the outer-side track in the frame recording mode—see FIG. 8):

The heads are first moved by the head shifting mechanism 110 in such a way as to have the magnetic head 102 at the outer-side track and the magnetic head 104 at a track on the inner side of the above-stated track.

(2-1) If the color/black-and-white discrimination code is "0", thus indicating the black-and-white recording; and (2-1-1) if the recording mode discrimination code is found to be "01", thus indicating a frame reproduction mode at a step S218, the flow comes to a step S220. At the step S220: to carry out the frame reproduction mode, the contacts "a" and "b" of the change-over switches 118A and 118B are alternately connected to their contacts "e" and "c" at a timing synchronized with the PG pulse which is generated by the PG pulse generator 116. Steps S222 and S224: the frequency-modulated luminance signals of the first and second field which are recorded in the tracks Y1 and Y2 as shown in FIG. 5(B) are reproduced.

Step S226: with these procedures repeated, a black-and-white frame image signal is obtained.

(2-2) If the color/black-and-white discrimination code is "1", thus indicating the color recording; and (2-2-1) if the recording mode discrimination code is found to be "01", thus indicating a frame reproction mode at a step S250, the flow comes to a step S252. At the step S252: an action of simultaneously connecting the contacts "a" and "c" of the change-over switches 118A and 118B to their contacts "e" and "f" and another action of alternately connecting the contacts "b" and "d" of these switches 118A and 118B to their contacts "e" and "f" are performed at a timing synchronized with the PG pulse generated by the PG pulse generator 116. Steps S254 and S256: the color signals first and second fields are alternately reproduced. Step S258: with these actions repeated, a color frame image signal is reproduced.

(3) In a case where the recording mode discrimination code is "11" (for high-definition recording):

(3-1) If the color/black-and-white discrimination code is "0", indicating the black-and-white recording; and (3-1-1) if the recording mode discrimination code is found to be "11", thus indicating the black-and-white reproduction in the high-definition reproduction mode at a step S228, the flow comes to a step S230. At the step S230: the system controller 150 causes the head shifting mechanism 110 to move the magnetic heads 102, 104, 106 and 108 to tracks having the codes "11", "10", "01" and "10" respectively. Next, the change-over switch 118A is controlled to connect its contacts "a", "b", "c" and "d" to the contact "e" one after another repeatedly by turns in synchronism with the timing of the PG pulse generated by the PG pulse generator 116.

Steps S232, S234, S236, S238 and S240: as a result, black-and-white high-definition image signals are repeatedly output from the luminance signal output terminal 126A, in such a sequence as the signals of tracks Y1, Y2, Y3, Y4, Y1, Y2, Y3, Y4, - - - .

(3-2) If the color/black-and-white discrimination code is "1", indicating the color recording; and (3-2-1) if the recording mode discrimination code recorded in the outermost track is "11", the embodiment is set in the first or second high-definition reproduction mode.

The following description is given on the assumption that a reproducing operation is performed with a multiple magnetic head having eight channels:

Recording tracks which are formed in the first high-definition recording mode to give one high-definition color image include four frequency-modulated luminance signal recording tracks and two frequency-modulated multiplex color-difference signal recording tracks, as shown in FIG. 6(C). Among these tracks, two tracks in which the frequency-modulated multiplex color-difference signal is recorded do not include any ID signal therein. In reproducing the record with the multiple magnetic head having eight channels, therefore, the record can be determined, at a step S260, to have been recorded in the first high-definition recording mode if the following conditions (i) to (iii) are satisfied:

(i) The recording mode discrimination code "11" is detected from the outermost track.

(ii) Including the above-stated outermost track, the frequency-modulated luminance signal is recorded in all the four tracks.

(iii) Among all the signals reproduced by the 8 magnetic head channels, no ID signal is detected from the signals reproduced by two adjacent head channels.

Meanwhile, when the following conditions (i) to (iii) are satisfied, at a step S272, the signals can be determined to have been recorded in the second high-definition recording mode:

(i) The recording mode discrimination code "11" is detected from the outermost track.

(ii) Including the above-stated outermost track, the frequency-modulated luminance signal is recorded in all the four tracks.

(iii) Among all the signals reproduced by the 8 magnetic head channels, no ID signal is detected from the signals reproduced by four adjacent head channels.

(3-2-1-1) If the first high-definition reproduction mode is found at the step S260, the flow comes to a step S262. Steps S262, S264, S266, S268 and S270: for the frequency-modulated luminance signal, the changeover switch is controlled in synchronism with the PG pulse output from the PG pulse generator 116 in the same manner as in the case of the black-and-white reproduction mode. The luminance signal is thus repeatedly reproduced from the tracks Y1, Y2, Y3, Y4 in the order of Y1, Y2, Y3, Y4, Y1, Y2, - - - . At the same time, the frequency-modulated multiplex color-difference signal is repeatedly reproduced from tracks C3 and C4 in the order of C3, C4, C3, C4, - - - . As a result, the output terminals 126A, 138A and 146A output signals Y, R-Y and B-Y in the following signal forms:

Y output: Y1, Y2, Y3, Y4, Y1, Y2, Y3, Y4, - - - R-Y output: R-Y3, R-Y4, R-Y3, R-y4, R-Y3, R-Y4 - - - 
B-Y output: B-Y3, B-Y4, B-Y3 B-Y4 B-Y3 B-Y4 - - -

(3-2-1-2) If the second high-definition reproduction mode is found at the step S272, the flow comes to a step S274. Steps S274, S276, S278, S280 and S282: with the multiple magnetic head of eight channels used as mentioned above, the frequency-modulated luminance signal is processed by controlling the change-over switch in synchronism with the PG pulse of the PG pulse generator 116 in the same manner as in the case of the first highdefinition reproduction mode. The luminance signal is thus repeatedly reproduced from the tracks Y1, Y2, Y3 and Y4 in the order of Y1, Y2, Y3, Y4, Y1, Y2, Y3, Y4, - - - (see FIG. 6(D)). As for the frequency-modulated multiplex color-difference signal, the signal is repeatedly reproduced from the tracks C1, C2, C3 and C4, unlike in the case of the first high-definition reproduction mode, in the order of tracks C1, C2, C3, C4, C1, C2, C3, C4, - - - . The color resolution in the vertical direction of a color image reproduced in the second high-definition reproduction mode is better than that of a color image reproduced in the first high-definition reproduction mode.

The output terminals 126A, 138A and 146A eventually output the signals Y, R-Y and B-Y in the following signal forms:

Y output: Y1, Y2, Y3, Y4, Y1, Y2, Y3, Y4, - - -
R-Y output: R-Y1, R-Y2, R-Y3, R-Y4, R-Y1, R-Y2, R-Y3, R-Y4, - - -
B-Y output: B-Y1, B-Y2, B-Y3, B-Y4, B-Y1, B-Y2, B-Y3, B-Y4, - - -

In the last place, the image signals reproduced in the first and second high-definition reproduction modes are processed in the following manner: FIG. 11 shows in a block diagram a scan converter to be used for reproduction. The scan converter is arranged to convert two frame pictures conforming to the NTSC system into one high-definition TV picture and, in addition to that, to generate an image signal corresponding to a reduced size picture recorded in each of the tracks formed on the magnetic disc. The reduced-size image signal forming operation of the device shown in FIG. 11 is as follows:

In the case of this embodiment, with the magnetic disc 100 loaded on the apparatus, when the rotating speed of the disc reaches a given speed, the system controller 150 of FIG. 9 supplies switch connection control signals to switches 210, 212, 214 and 216. This causes the connecting position of each of these switches to shift to one side B. At the same time, in accordance with the contents of the ID signal being reproduced from the magnetic disc 100, the system controller 150 detects the recording mode of the track currently being under a reproducing action. Then, the switching action on the magnetic heads is controlled in such a way as to perform the reproducing action in a reproduction mode corresponding to the recording mode detected. The system controller 150 supplies a control signal B to a memory control circuit 220 of FIG. 11. This causes the memory control circuit 220 to perform a memory control action which corresponds to the reproduction mode designated by the system controller 150. To the memory control circuit 220 is supplied a composite sync signal from the sync signal separation circuit 152. In synchronism with the composite sync signal, the memory control circuit 220 generates a sampling clock signal fs' which is of a frequency lower than that of a sampling clock signal fs which is used for normal reproduction as will be described later. The low frequency sampling clock signal fs' is supplied to A/D converters 204, 206 and 208 via the switch 210 which has its connecting position on one side B thereof.

Meanwhile, to the A/D converters 204, 206 and 208 are supplied the luminance signal Y and the color-difference signals R-Y and B-Y which have been reproduced and converted into RGB signals by an RGB matrix circuit 202. The A/D converters 204, 206 and 208 convert these signals into, for example, 8-bit digital data per sample in accordance with the sampling clock signal fs'. These digital data are then supplied to switches 228, 230 and 232 via switches 212, 214 and 216 which are connected to their sides B respectively.

The connecting positions of the switches 228, 230 and 232 are controlled by the memory control circuit 220. In accordance with the reproduction mode designated by the system controller 150, the memory control circuit 220 shifts the connecting position of each of the switches 228, 230 and 232 between its one side C and another side D for every frame period. As a result, the frame image data for a first picture is stored in first frame memories 234b, 238b and 242b while the frame image data for a second picture is stored in second frame memories 236b, 240b and 244b respectively.

However, since the sampling clock signal fs' is set at a lower frequency than the sampling clock signal fs for normal reproduction as mentioned above, an image expressed by image data stored in the frame memories is in a reduced size which is smaller than an image obtainable by ordinary reproduction. After one picture amount of image data is stored in the frame memories, the system controller 150 causes the magnetic heads to be moved inward. Then, reduced size image data is stored in the frame memories in the same manner as described above. After that, the above-stated actions are repeated until reduced size image data which corresponds to an image signal recorded in the innermost track on the magnetic disc is stored in the frame memories.

When the reduced size image data is completely stored in the frame memories, the operating mode of the memory control circuit 220 becomes a high-definition reading mode. In this reading mode, the frame image data for the first picture (image data for two fields) stored in first frame memories 234b, 238b and 242b is read out in a non-interlacing manner. Following this, the frame image data for the second picture (image data for two fields) stored in second frame memories 236b, 240b and 244b is likewise read out in the non-interlacing manner. Then, the non-interlacing reading for the frame image data of the first picture and the non-interlacing reading for the frame image data of the second picture are alternately repeated to obtain high-definition interlaced image data having 1125 scanning lines.

The high-definition interlaced image data thus formed by the above-stated actions is converted into analog signals by D/A converters 246, 248 and 250. The analog signals thus obtained are supplied to a conversion matrix circuit 252. The conversion matrix circuit 252 forms high-definition signals Y, CN and CW from the RGB signals which jointly form the high-definition interlaced image data. These signals Y, CW and CN are supplied to a monitor device or the like which is not shown.

The reduced size image data stored in the frame memories is arranged to be changed or to be gradually replaced either when another magnetic disc is loaded on the apparatus or when the contents of the record carried by the currently loaded magnetic disc are changed. Further, the reduced size image data stored in the frame memories can be displayed any time by operating the operation part 156 of FIG. 9 to read the data from the frame memories.

Further, any one of the reduced size images obtained in the above-stated manner can be readily reproduced, by an ordinary reproducing action, by operating the operation part 156 to select it while watching the display of reduced images and thus by instructing the system controller 150 to cause the magnetic heads to be moved to a recording track in which the image signal corresponding to the selected image is recorded.

The following describes the operation of the device of FIG. 11 with reference to FIG. 12 which is a flow chart steps S300, S302 and S304 of FIG. 12: with the magnetic head moved to a desired recording track in response to the instruction of the system controller 150 of FIG. 9, signals are reproduced by the magnetic head. The ID signal included in the reproduced signals is checked for the high-definition recording mode. If the tracks are found to have been formed in the high-definition recording mode as a result of the check, the flow of operation comes to a step S308 to have the reproduced signals supplied to the scan converter. The luminance signal Y and the color-difference signals R-Y and B-Y which are reproduced are converted into RGB signals by the RGB matrix circuit 202. The RGB signals are supplied to the A/D converters 204, 206 and 208.

The system controller 150 of FIG. 9 supplies switch connection control signals to the switches 210, 212, 214 and 216 of FIG. 11. Each of these switches 210, 212, 214 and 216 is connected to one side A thereof. Meanwhile, a control signal A is supplied to the memory control circuit 218 of FIG. 11. This causes the memory control circuit 218 to perform a memory control action corresponding to the reproduction mode designated by the system controller 150. Further, to the memory control circuit 218 is supplied a composite sync signal from the sync signal separation circuit 152 of FIG. 9. In synchronism with the composite sync signal, the memory control circuit 218 generates the sampling clock signal fs for normal reproduction. The sampling clock signal fs is supplied to the A/D converters 204, 206 and 208 via the switch 210 which is connected to the side A thereof.

At the A/D converters 204, 206 and 208, the RGB signals supplied from the RGB matrix circuit 202 are converted into digital data of eight bits per sample according to the sampling clock signal fs. The digital data thus obtained is supplied to the switches 228, 230 and 232 via the switches 212, 214 and 216 which are connected to their sides A. These switches 228, 230 and 232 operate under the control of the memory control circuit 218 to store the image data of the first frame in the first frame memories 234a, 238a and 242a and the image data of the second frame in the second frame memories 236a, 240a and 244a (Steps S308, S310, S312 and S314).

After completion of the storing action of the step S314, the flow comes to a step S316. Steps S316 and S318: the operating mode of the memory control circuit 218 is changed to the high-definition reading mode. The reading action is performed at a reading speed which is about two times as high as the speed at which the above-stated storing action is performed. By this reading action, the image data of the first frame (image data for two fields) stored in the first frame memories is first read out in a non-interlacing manner. Next, the image data of the second frame (image data for two fields) stored in the second frame memories is read out also in the non-interlacing manner.

Then, high-definition interlaced image data including 1125 scanning lines is obtained by alternately repeating the above-stated non-interlacing reading action on the image data of the first frame and the non-interlacing reading action on the image data of the second frame. Step S320: the high-definition interlaced image data is converted into analog signals by D/A converters 246, 248 and 250. The analog signals thus obtained are sent to a conversion matrix circuit 252. The conversion matrix circuit 252 is arranged to obtain signals Y, CW and CN for a high-definition TV signal from the RGB signals which form a high-definition interlaced image signal. In other words, the signals Y, CW and CN which give a high-definition TV signal are output through the conversion matrix circuit 252.

For recording an image signal corresponding to one picture by separately recording a luminance signal and a chrominance signal, the embodiment described is arranged to record each of these signals in block separately from each other. Therefore, in cases where only the black-and-white recording is performed, only the luminance signal recording tracks are assembled together on the magnetic disc. This prevents any vacant track from being left on the disc, so that the recording can be efficiently carried out according to the recording mode selected. In other words, in cases where the recording is to be made only in the black-and-white recording mode on one magnetic disc, the invented arrangement permits recording a greater number of pictures than the conventional arrangement of allotting fixed recording tracks in such a way as to record the luminance signal in odd-number tracks and the chrominance signal in even-number tracks. This is an economic advantage.

Further, in cases where only the chrominance signal is to be erased from a magnetic disc on which a color image signal is already recorded, the embodiment permits easy and efficient erasing as the tracks having the record of the chrominance signal are allocated adjacently according to the invented arrangement. Further, in a case where the vacant tracks from which the record has been erased are to be used for recording again, the recording action can be easily carried out, according to the invented arrangement, as a plurality of vacant tracks are adjacently located.

The embodiment described is arranged to record the recording mode discrimination code by multiplexing it with the luminance signal for discrimination between a black-and-white-mode-recorded signal and a color-mode-recorded signal. In reproducing the recorded signals, therefore, the record is reproduced first from a recording track in which the luminance signal is recorded and a discrimination between the black-and-white recording mode and the color recording mode can be made by using the recording mode discrimination code reproduced with the luminance signal. Therefore, the sequence of color image signal reproducing actions can be easily accomplished. Compared with the method of making a discrimination between the color and black-and-white modes by the presence or absence of a burst signal, the embodiment seldom makes a recording mode discrimination error.

Further, since the luminance signal and the chrominance signal are recorded in separate tracks, no filters or the like are required for separating them during the process of reproduction. This eliminates the possibility of signal deterioration due to the use of filters or the like. It is another advantage of the embodiment that at least an image signal is obtainable in black-and-white by just reproducing the track in which the luminance signal is recorded.

The embodiment of the invention is capable of recording and reproducing the first or second high-definition image signal to give a high-definition picture consisting of two frame images, with the 525 scanning lines of each frame being shifted upward or downward relative to another by as much as ½ scanning line pitch. Discrimination information on the first and second high-definition recording modes are recorded in a state of being multiplexed with the luminance signal. Therefore, in reproducing recorded signals, the recording mode can be easily and accurately discriminated from other recording modes. Further, the arrangement to provide an external device with information on the result of the discrimination obviates the necessity of providing any discrimination circuit or the like on the side of the external device.

In the case of the embodiment described, reduced size image data is formed by digitizing an image signal reproduced from a magnetic disc; and the image data thus obtained is temporarily stored in the memory, so that the kind of the image signal recorded on the magnetic disc can be easily detected. Then, with any one of the reduced size images designated, the image signal recorded on the magnetic disc can be easily looked up for the desired part thereof.

Further, in the case of the embodiment, one field amount of frequency-modulated color-difference signals R-Y and B-Y is arranged to be frequency-multiplexed and recorded in one and the same recording track. However, the arrangement may be changed to record the frequency-modulated signals R-Y and B-Y in separate recording tracks. This change enables the embodiment to record and reproduce a still better picture. Further, the embodiment is arranged to form concentric circular recording tracks on the magnetic disc by recording signals on the disc. However, the invention is of course applicable also to an apparatus of the kind arranged to record and reproduce signals on and from an optical disc or a tape-shaped magnetic recording medium (magnetic tape).

As mentioned in the foregoing, the recording and reproducing apparatus arranged according to this invention allows a wider band to be allotted for the luminance signal than that of the conventional apparatus by virtue of its arrangement to record the luminance signal and the chrominance signal separately in different recording tracks.

Further, with the luminance signal and the chrominance signal arranged to be recorded in separate tracks, the recording and reproducing apparatus according to this invention is capable of recording and reproducing color image signals on and from the recording medium without being affected by any distortion that would otherwise result from the cross modulation between the two signals. This arrangement also permits easy detection of the contents of the image signal recorded on the recording medium.

What is claimed is:

1. A recording and reproducing apparatus for recording a still image signal for one picture comprising a luminance signal and a chrominance signal on a recording medium and for reproducing the still image signal from said recording medium on which said still image signal is recorded, comprising:
    a) recording means for recording the still image signal for the one picture on the recording medium, said recording means being arranged to separate said luminance signal and said chrominance signal which constitute said still image signal for said one picture and to record said signals on a plurality of recording tracks, respectively;
    b) reproducing means for reproducing the luminance signal for the one picture from the recording track on which at least the luminance signal is recorded among the plurality of recording tracks on said recording medium in which the still image signal has been recorded by said recording means;
    c) sampling means for sampling the luminance signal reproduced by said reproducing means in synchronism with a first clock signal or a second clock signal having a frequency lower than that of said first clock signal, thereby forming a sampling signal;
    d) storing means for temporarily storing the sampling signal formed by said sampling means; and
    e) still image signal output control means for selectively reading out and outputting, from said storing means, either one of the sampling signal which has been sampled in synchronism with said first clock signal by said sampling means and has been temporarily stored in said storing means or the sampling signal which has been sampled in synchronism with said second clock signal and has been stored in said storing means, in synchronism with a third clock signal having a frequency equal to that of said first clock signal.

2. A recording and reproducing apparatus according to claim 1, wherein said still image signal output control means is arranged to read out the sampling signal which has been sampled in synchronism with the first clock signal by said sampling means and has been temporarily stored in said storing means, in the case where the luminance signal reproduced from said recording medium by said reproducing means is outputted as a still image signal corresponding to a still image of a first picture size, and to read out the sampling signal which has been sampled in synchronism with the second clock signal by said sampling means in synchronism with a third clock signal having a frequency equal to that of said first clock signal, in the case where the luminance signal reproduced from said recording medium by said reproducing means is outputted as a still image of a second picture size smaller than said first picture size.

3. A recording and reproducing apparatus for recording a still image signal on a recording medium and reproducing the still image signal recorded on said recording medium, comprising:
    a) recording means for recording either one of a first still image signal or a second still image signal corresponding to a still image having a higher resolution than that of a still image corresponding to said first still image signal;
    b) reproducing means for reproducing said first still image signal or second still image signal recorded on said recording medium;
    c) sampling means for sampling said first still image signal reproduced from said recording medium by said reproducing means in synchronism with a first clock signal and sampling said second still image signal reproduced from said recording medium by said reproducing means in synchronism with a second clock signal having a frequency lower than that of said first clock signal, thereby forming a sampling signal;
    d) storing means for temporarily storing the sampling signal formed by said sampling means; and
    e) still image signal output control means for reading out the sampling signal, which has been temporarily stored in said storing means, in synchronism with a third clock signal having a frequency higher than that of said first clock signal, thereby forming and outputting a still image signal corresponding to a reduced picture size.

4. A recording and reproducing apparatus according to claim 3, wherein said recording medium has a plurality of recording tracks, and said recording means is arranged to record the second still image signal for said one picture on recording tracks of larger number of recording tracks on which the first still image signals for said one picture are recorded.

* * * * *

UNITED STATES PATENT AND TRADEMARK OFFICE
CERTIFICATE OF CORRECTION

PATENT NO. : 5,194,962
DATED : March 16, 1993
INVENTOR(S) : Tsuguhide Sakata

It is certified that error appears in the above-identified patent and that said Letters Patent is hereby corrected as shown below:

| | |
|---|---|
| Col. 4, line 16 | Change "etc.." to -- etc. -- |
| Col. 6, line 8 | Change "S76" to -- S16 -- |
| Col. 6, line 14 | Change "code 11" to -- code "11", -- |
| Col. 6, line 14 | After "mode" insert -- , -- |
| Col. 7, line 7 | After "frame" insert -- , -- |
| Col. 7, line 8 | After "fields" insert -- , -- |
| Col. 7, line 8 | After "frame" insert -- , -- |
| Col. 7, line 9 | Change "field" to -- fields-- |
| Col. 8, line 29 | After "S70" insert -- , -- |
| Col. 11, line 58 | After "signal" insert -- , -- |
| Col. 12, line 23 | After "signal" insert -- , -- |
| Col. 12, line 24 | After "120" insert -- , -- |
| Col. 13, line 17 | Change "field" to -- fields, -- |
| Col. 13, line 18 | After "5B" insert -- , -- |
| Col. 13, line 24 | Change "reproction" to -- reproduction -- |
| Col. 13, line 33 | After "signals" insert -- of -- |

UNITED STATES PATENT AND TRADEMARK OFFICE
CERTIFICATE OF CORRECTION

PATENT NO. : 5,194,962
DATED : March 16, 1993
INVENTOR(S) : Tsuguhide Sakata

It is certified that error appears in the above-identified patent and that said Letters Patent is hereby corrected as shown below:

| | |
|---|---|
| Col. 14, line 59 | Change "highdefinition" to -- high-definition -- |
| Col. 16, line 16 | After "data" insert -- , -- |
| Col. 16, line 18 | After "disc" insert -- , -- |
| Col. 16, line 64 | After "chart" insert -- . --, change "steps" to -- Steps -- |
| Col. 20, line 7 | Change "signal" to -- signals -- |

Signed and Sealed this

Thirtieth Day of November, 1993

Attest:

BRUCE LEHMAN

Attesting Officer

Commissioner of Patents and Trademarks